(12) United States Patent
Lin et al.

(10) Patent No.: US 12,395,619 B1
(45) Date of Patent: Aug. 19, 2025

(54) MULTI-LAYERED AND THREE-DIMENSIONAL DISPLAY TOUCH DEVICE

(71) Applicant: Y.LIN ELECTRONICS CO., LTD., Guangdong (CN)

(72) Inventors: Qicheng Lin, Guangdong (CN); Guoliang Qiu, Miaoli County (TW); Hongrui Wu, Guangxi (CN); Zhichao Ye, Guangdong (CN)

(73) Assignee: Y.LIN ELECTRONICS CO., LTD., Dongguan (CN)

( * ) Notice: Subject to any disclaimer, the term of this patent is extended or adjusted under 35 U.S.C. 154(b) by 0 days.

(21) Appl. No.: 19/004,412

(22) Filed: Dec. 29, 2024

(30) Foreign Application Priority Data

Dec. 18, 2024 (CN) .......................... 202411872664.7

(51) Int. Cl.
*H04N 13/354* (2018.01)
*G06F 3/044* (2006.01)
*G06F 3/045* (2006.01)

(52) U.S. Cl.
CPC ........... *H04N 13/354* (2018.05); *G06F 3/044* (2013.01); *G06F 3/045* (2013.01); *G06F 2203/04102* (2013.01); *H04N 2213/001* (2013.01)

(58) Field of Classification Search
None
See application file for complete search history.

(56) References Cited

U.S. PATENT DOCUMENTS

| | | | |
|---|---|---|---|
| 2011/0234651 A1* | 9/2011 | Chen ........................ | G09G 5/10 345/690 |
| 2021/0364856 A1* | 11/2021 | Su ........................ | G02B 6/0045 |
| 2021/0405809 A1* | 12/2021 | Khajeh ................ | G06F 3/04182 |
| 2022/0148533 A1* | 5/2022 | Pacheco ................ | G09G 3/3208 |
| 2022/0287167 A1* | 9/2022 | Wang ........................ | F21S 4/10 |
| 2023/0107814 A1* | 4/2023 | Fouts ........................ | A63F 9/10 273/156 |

\* cited by examiner

*Primary Examiner* — Edemio Navas, Jr.

(57) ABSTRACT

Disclosed is a novel multi-layered and three-dimensional display touch device, and the device includes: a housing is provided with a mounting groove, a partition plate is arranged inside the mounting groove, and a plurality of light-transmitting grooves are formed in the partition plate; a PCB is mounted on one side of the partition plate, the PCB is provided with functional light sources, and spatial positions of the functional light sources correspond to the light-transmitting grooves; and a functional film, a light guide plate, and a surface film are sequentially mounted on the other side of the partition plate, where the functional film is provided with a functional pattern composed of a plurality of gratings, a background light source is mounted at a side edge of the light guide plate, and the background light source provides lateral illumination to the light guide plate.

10 Claims, 2 Drawing Sheets

MULTI-LAYERED AND THREE-DIMENSIONAL DISPLAY TOUCH DEVICE

CROSS REFERENCE TO RELATED APPLICATIONS

The present application claims the benefit of Chinese Patent Application No. 202411872664.7 filed on Dec. 18, 2024, the contents of which are incorporated herein by reference in their entirety.

TECHNICAL FIELD

The present disclosure relates to the technical field of displays, and in particular to a novel multi-layered and three-dimensional display touch device.

BACKGROUND

In the prior art, large household appliances, small household appliances, smart home devices, kitchen appliances, bathroom appliances, industrial control appliances, and 3C appliances, such as washing machines, dryers, rice cookers, soup pots, range hoods, disinfection cabinets, countertop dishwashers, and microwave ovens, are provided with corresponding display screens/LED light sets and buttons or touch display screens to achieve corresponding human-computer interaction control functions.

A traditional display interaction system includes a LED light set, a backlight panel, a pattern film, and a button module. During use of the system, all patterns are illuminated through the backlight panel and LED lamps, and functional identification is achieved by switching different LED lamps to remain lit or flash, where the button module can be upgraded to a capacitive touch module.

However, patterned edge-illuminated LED displays of the prior art, in a standby state, directly display patterns, digital lamp tubes and the like, and users can clearly observe their colors and contours, that is, when a display is in the standby state, a front panel observed by a user is of a nonsolid color, and is disjointed.

Further, consumers have more demands for the patterned edge-illuminated LED displays of household appliances, such as background display and three-dimensional display with more atmosphere and aesthetics.

Therefore, there is an urgent need for a novel multi-layered and three-dimensional display touch device that can solve one or more problems above.

SUMMARY

In order to solve one or more problems in the prior art, the present disclosure provides a novel multi-layered and three-dimensional display touch device. The technical solution used by the present disclosure in order to solve the problems above is as follows: a novel multi-layered and three-dimensional display touch device, including: a housing, where the housing provided with a mounting groove, a partition plate is arranged inside the mounting groove, and a plurality of light-transmitting grooves are formed in the partition plate;
    a PCB is mounted on one side of the partition plate, the PCB is provided with functional light sources, and spatial positions of the functional light sources correspond to the light-transmitting grooves;
    a functional film, a light guide plate and a surface film are sequentially mounted on the other side of the partition plate, where the functional film is provided with a functional pattern composed of a plurality of gratings and/or printed images, a background light source is mounted at a side edge of the light guide plate, and the background light source provides unilateral/multilateral lateral illumination to the light guide plate;
    background display: when the device is in a standby non-display state, the background light source is activated and laterally illuminates the light guide plate; and
    functional display: when the device is in a startup display state, the functional light source of the PCB is activated, illuminates the functional film, and provides a three-dimensional display function through the plurality of gratings.

In some examples, a background pattern is formed on the surface film, and the background pattern is formed on the surface film through laser carving or printing.

In some examples, the surface film is a fully transparent/semi-transparent film.

In some examples, the device further includes: a button assembly, where the button assembly is arranged on the PCB or the housing.

In some examples, any one or more of the functional film, the surface film, and the PCB are provided with a touch circuit, the touch circuit is configured for achieving a touch function, and the touch circuit is capacitive or resistive.

In some examples, a touch circuit is printed on one surface of the functional film, the touch circuit is electrically connected to the PCB, the touch circuit is configured for achieving the touch function, and the touch circuit is capacitive or resistive.

In some examples, the surface film is provided with a first touch area, a touch circuit is printed in the first touch area, the touch circuit is electrically connected to the PCB, the touch circuit is configured for achieving the touch function, and the touch circuit is capacitive or resistive.

In some examples, the PCB is provided with a second touch area, a touch circuit is arranged in the second touch area, the touch circuit penetrates through the partition plate and is connected with the functional film, and the touch circuit is capacitive or resistive.

In some examples, the background light source includes a plurality of independently controllable light beads, and when the background display is executed, the light beads can be controlled to turn on/off and change in colors and brightness according to a preset program.

The technical effects achieved by the present disclosure are as follows: the display touch device achieves an independent background display in a standby state, avoids exposure of a specific contour of an internal digital tube or a light-transmitting groove, achieves a dynamic effect of background display in the chase lighting manner through light control, and meets consumers' aesthetic and atmospheric requirements; and through functional pattern display on the functional film in a startup state, consumers' use needs are met and a three-dimensional functional pattern display effect is achieved, and visual effects are further enriched by controlling on/off states, colors and brightness changes of the LED lamps.

REFERENCE NUMERALS IN THE FIGURES

1. Housing; 10. mounting groove; 11. partition plate; 110. light-transmitting groove; 2. PCB; 3. functional film; 4. light guide plate; 40. background light source; and 5. surface film.

DETAILED DESCRIPTIONS OF THE EMBODIMENTS

In order to enable the objectives, features, and advantages mentioned above of the present disclosure to be more apparent and easily understood, specific implementations of the present disclosure will be described in detail below with reference to the drawings. Numerous specific details are set forth in the following description to facilitate a thorough understanding of the present disclosure. However, the present disclosure may be implemented in many other ways different from those described herein, similar improvements may be made by those skilled in the art without departing from the connotation of the present disclosure, and therefore the present disclosure is not limited by specific embodiments disclosed below.

Figure 1:
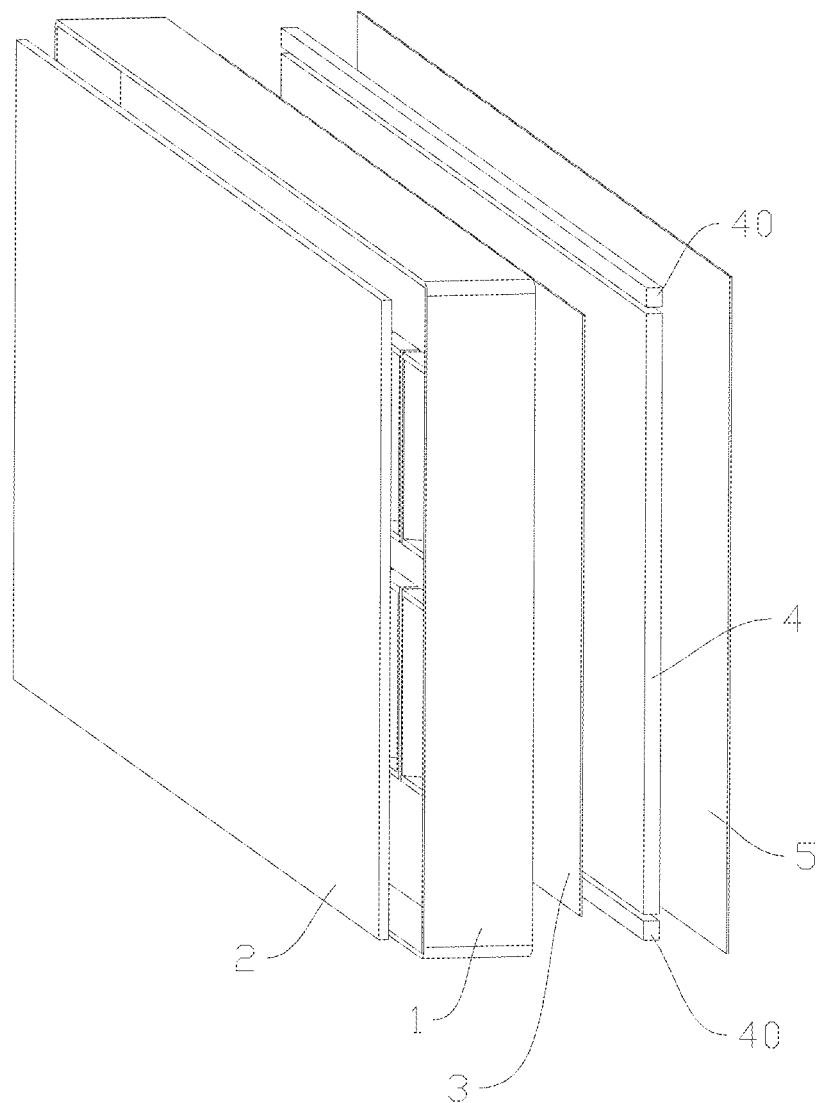
FIG. 1 is an exploded view of the present disclosure.
Figure 2:
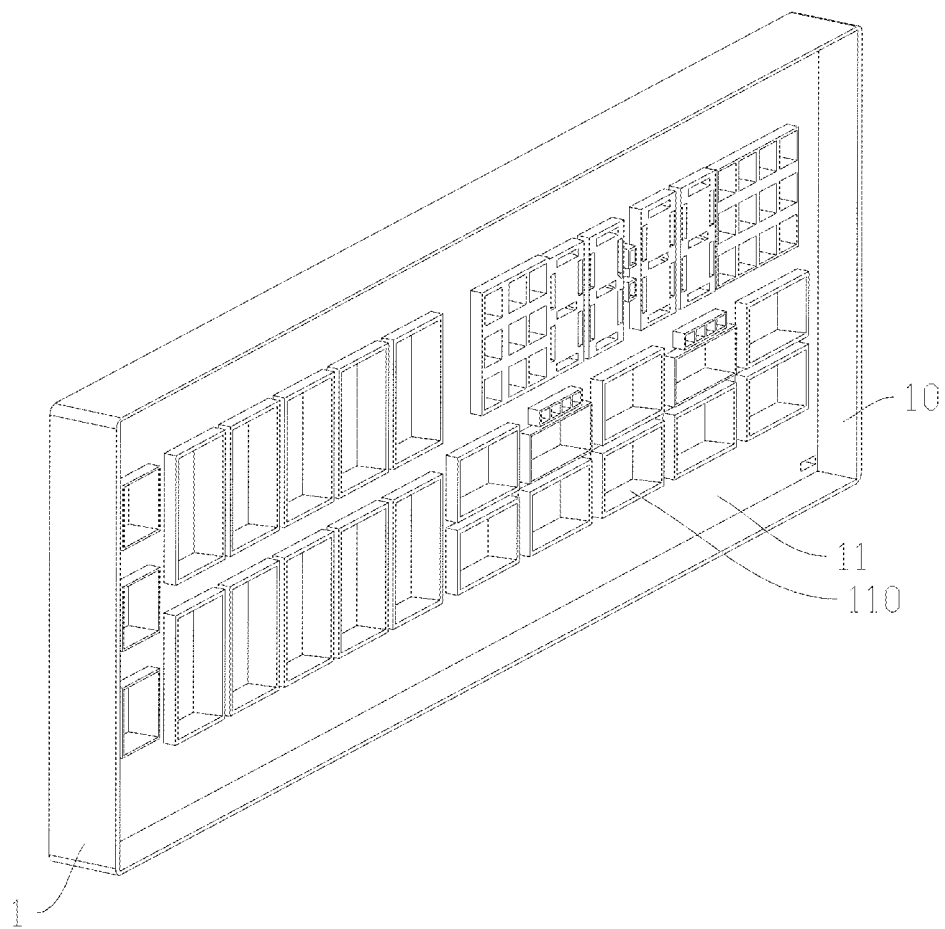
FIG. 2 is a schematic diagram of a housing of the present disclosure.

As illustrated in FIGS. 1 and 2, the present disclosure discloses a novel multi-layered and three-dimensional display touch device, and the device includes: a housing 1, where the housing 1 provided with a mounting groove 10, a partition plate 11 is arranged inside the mounting groove 10, and a plurality of light-transmitting grooves 110 are formed in the partition plate 11;

a PCB 2 is mounted on one side of the partition plate 11, the PCB 2 is provided with functional light sources, and spatial positions of the functional light sources correspond to the light-transmitting grooves 110;

a functional film 3, a light guide plate 4, and a surface film 5 are sequentially mounted on the other side of the partition plate 11, where the functional film 3 and the surface film 5 are both light-transmitting films, the functional film 3 is provided with a functional pattern composed of a plurality of gratings and/or printed images, a background light source 40 is mounted at a side edge of the light guide plate 4, and the background light source 40 provides unilateral/multilateral lateral illumination to the light guide plate 4;

specifically, a first part of the functional pattern is a pattern composed of a plurality of gratings, a second part thereof is a printed image, and the two parts can be combined to achieve better functional icon display;

background display: when the device is in a standby non-display state, the background light source 40 is activated and laterally illuminates the light guide plate 4; and functional display: when the device is in a startup display state, the functional light source of the PCB 2 is activated, illuminates the functional film 3, and provides a three-dimensional display function through the plurality of gratings.

It should be noted that the surface film 5 is a fully transparent/semi-transparent film, the functional film 3 is a white or transparent film, and the surface film 5 and the functional film 3 can be any one of a flexible PET film, a flexible PC film and PMMA. Frosted texture can be formed on a front face or a back face of the surface film 5, and both surfaces of the functional film 3 are smooth. The PCB 2 is provided with a corresponding main control module, a power module, a control module, a dimming module, and a communication module, the functional light source includes a plurality of independently controllable LED beads arranged on the PCB 2, and light crosstalk prevention is achieved through the light-transmitting grooves 110. Further, the background light source 40 can include a plurality of monochromatic light beads or RGB light strips, and the RGB light strips are provided with corresponding control ICs to achieve effects of waterfall lighting and chase lighting.

Specifically, the background light source 40 includes a plurality of independently controllable light beads, and when the background display is executed, the light beads can be controlled to turn on/off and change in colors and brightness according to a preset program.

Specifically, a background pattern is formed on the surface film 5, the background pattern is formed on the surface film 5 through laser carving or printing, during the background display, the background pattern appears under illumination, and the background pattern can be a starry sky background pattern or any other decorative background pattern.

Specifically, the display touch device is capable of achieving human-computer interaction through various means, any one or more of the functional film 3, the surface film 5, and the PCB 2 are provided with a touch circuit, the touch circuit is configured for achieving a touch function, and the touch circuit is capacitive or resistive. For example, an implementation scheme is as follows: 1. a button assembly is arranged, the button assembly is arranged on the PCB 2 or the housing 1, and the button assembly is electrically connected to the PCB 2; 2. A touch circuit is printed on one surface of the functional film 3, the touch circuit is electrically connected to the PCB 2, the touch circuit is configured for achieving a touch function, and the touch circuit is capacitive or resistive; 3. the surface film 5 is provided with a first touch area, a touch circuit is printed in the first touch area, the touch circuit is electrically connected to the PCB 2, the touch circuit is configured for achieving the touch function, and the touch circuit is capacitive or resistive; 4. the PCB 2 is provided with a second touch area, a touch circuit is arranged in the second touch area, the touch circuit penetrates through the partition plate 11 and is connected with the functional film 3, and the touch circuit is capacitive or resistive; and 5. the PCB 2 is provided with a spring touch assembly, the spring touch assembly is provided with plug-in light beads as backlight, and a force-bearing end of the spring touch assembly is connected with the functional film 3 or is arranged on the housing 1.

The above touch circuits are conventional capacitive or resistive touch circuits. Touch forms of the above touch circuits include: single-point touch and sliding touch. When the above touch circuits are capacitive, a triggering area is formed, the triggering area is coated with conductive ink, and the triggering area corresponds to a position of a corresponding button pattern or button text. An electrical connection of electrical components can be achieved through a flexible printed circuit (FPC) or a wiring terminal.

In use, when a user triggers the display touch device through a button or touch, the background display will be switched to the functional display.

In the functional display, the functional light source of the PCB is activated and illuminates the functional film, and the background light source is either turned off or in a light effect control state in this period, where the light effect control state is detailed as follows: the background light source provides light effect feedback according to the user's touch behavior (i.e., achieving lighting changes according to preset color changes, brightness changes and change intervals, and on/off states and on/off intervals of lighting sets), to provide a dynamic lighting feedback effect, which enhances a three-dimensional effect, such as a droplet ripple lighting effect centered around a touch point.

The functional light source illuminates the functional film, such that the functional pattern composed of the gratings is lit up. By modulating light, a three-dimensional dynamic display of the functional pattern through the grating can be achieved. Through the modulation, LED lamps corresponding to the spatial positions of the functional pattern can be lit up in a chase lighting manner. Lighting up in the chase lighting manner means sequentially turning on and off the LED lamps, controlling the brightness of the LED lamps to change in a decreasing or increasing manner sequentially, or controlling the colors of the LED lamps to change sequentially.

To sum up, the display touch device achieves an independent background display in a standby state, avoids exposure of a specific contour of an internal digital tube or a light-transmitting groove, achieves a dynamic effect of background display in the chase lighting manner through light control, and meets consumers' aesthetic and atmospheric requirements; and through functional pattern display on the functional film in a startup state, consumers' use needs are met and a three-dimensional functional pattern display effect is achieved, and visual effects are further enriched by controlling on/off states, colors and brightness changes of the LED lamps.

In the description of the present disclosure, it is also noted that unless expressly specified and defined otherwise, the terms "mount", "connect", "connected", etc. are to be construed broadly and, for example, may be fixedly connected or detachably connected, may be mechanically connected, or electrically connected; and may be directly connected, or indirectly connected by means of an intermediary medium, including communication between interiors of two elements. For those of ordinary skill in the art, the specific meanings of the above terms in the present disclosure may be understood according to specific circumstances.

The embodiments mentioned above are merely one or several implementations of the present disclosure, and are specifically described in details, but may not be interpreted as limiting the scope of the patent for the present disclosure as a result. It shall be noted that for those of ordinary skill in the art, they may also make several transformations and improvements on the premise of not deviating from the conception of the present disclosure, and these transformations and improvements shall fall within the scope of protection of the present disclosure. Hence, the scope of protection of the present disclosure shall be subject to the appended claims.

What is claimed is:

1. A multi-layered and three-dimensional display touch device, comprising:
   a housing, wherein the housing comprises:
      a mounting groove,
      a partition plate arranged inside the mounting groove, and
      a plurality of light-transmitting grooves formed in the partition plate;
   a PCB mounted on one side of the partition plate, wherein the PCB comprises a plurality of functional light sources, and spatial positions of the plurality of functional light sources correspond to the plurality of light-transmitting grooves in the partition plate; and
   a functional film, a light guide plate, and a surface film sequentially mounted on the other side of the partition plate, wherein the functional film comprises a functional pattern composed of a plurality of gratings and/or printed images, wherein a background light source is mounted at a side edge of the light guide plate, and wherein the background light source provides unilateral/multilateral illumination to the light guide plate,
   wherein for a background display when the device is in a standby non-display state, the background light source is activated that laterally illuminates the light guide plate, and
   wherein for a functional display when the device is in a startup display state, the plurality of functional light sources of the PCB is activated that illuminates the functional film, and provides a three-dimensional display function through the plurality of gratings.

2. The multi-layered and three-dimensional display touch device according to claim 1, wherein a background pattern is formed on the surface film.

3. The multi-layered and three-dimensional display touch device according to claim 2, wherein the background pattern is formed on the surface film through laser carving or printing.

4. The multi-layered and three-dimensional display touch device according to claim 1, wherein the surface film is a fully transparent/semi-transparent film.

5. The multi-layered and three-dimensional display touch device according to claim 1, further comprising:
   a button assembly, wherein the button assembly is arranged on the PCB or the housing.

6. The multi-layered and three-dimensional display touch device according to claim 1, wherein any one or more of the functional film, the surface film, and the PCB are provided with a touch circuit, wherein the touch circuit is configured for achieving a touch function, and wherein the touch circuit is capacitive or resistive.

7. The multi-layered and three-dimensional display touch device according to claim 1, wherein a touch circuit is printed on one surface of the functional film, wherein the touch circuit is electrically connected to the PCB, wherein the touch circuit is configured for achieving a touch function, and wherein the touch circuit is capacitive or resistive.

8. The multi-layered and three-dimensional display touch device according to claim 1, wherein the surface film is provided with a first touch area, wherein a touch circuit is printed in the first touch area, wherein the touch circuit is electrically connected to the PCB, wherein the touch circuit is configured for achieving a touch function, and wherein the touch circuit is capacitive or resistive.

9. The multi-layered and three-dimensional display touch device according to claim 1, wherein the PCB is provided with a second touch area, wherein a touch circuit is arranged in the second touch area, wherein the touch circuit penetrates through the partition plate and is connected with the functional film, and wherein the touch circuit is capacitive or resistive.

10. The multi-layered and three-dimensional display touch device according to claim 1, wherein the background light source includes a plurality of independently controllable light beads, and when the background display is executed, the plurality of light beads are controlled to turn on/off and change in colors and brightness according to a preset program.

* * * * *